UNITED STATES PATENT OFFICE.

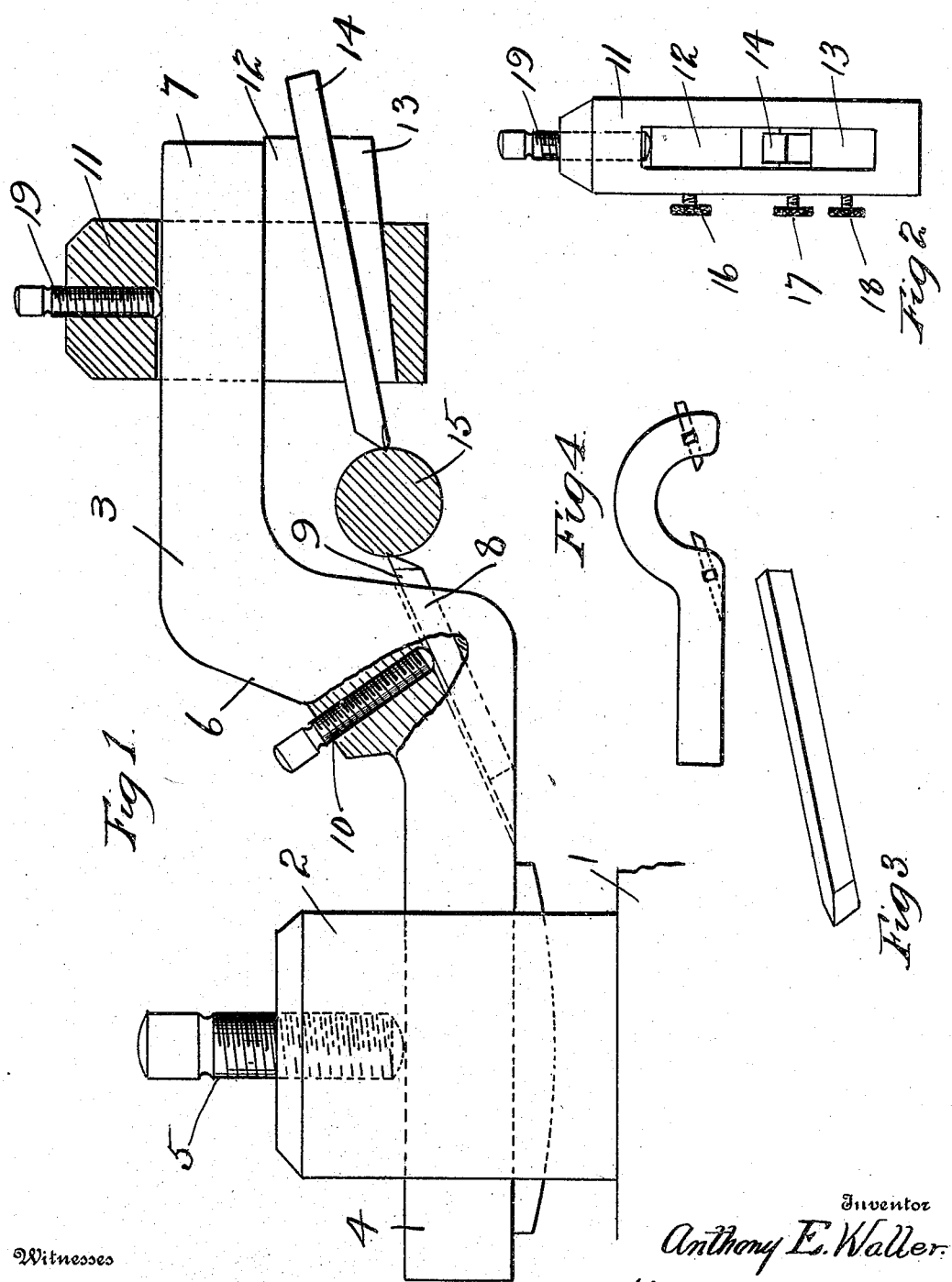

ANTHONY E. WALLER, OF PAWTUCKET, RHODE ISLAND.

CUTTING-TOOL.

939,359.  Specification of Letters Patent.  Patented Nov. 9, 1909.

Application filed April 18, 1906. Serial No. 312,413.

*To all whom it may concern:*

Be it known that I, ANTHONY E. WALLER, a citizen of the United States, residing at the city of Pawtucket, in the county of Providence and State of Rhode Island, have invented certain new and useful Improvements in Cutting-Tools, of which the following is a specification, reference being had therein to the accompanying drawing.

This invention relates to cutting tools for lathes and the like, and has for its object to provide a cutter bar that is adapted to be held in the ordinary tool post of a lathe or the like, which cutter bar is provided with two blades adapted to work simultaneously upon opposite sides of a rotating shaft or the like to facilitate the turning down or reducing the diameter of the same.

In the use of the ordinary lathe when it is desired to reduce the diameter of a shaft or other work to be turned the usual cutting tool is placed in the tool post of the lathe and held to engage one side of said work to take a chip from the same for the desired distance while said work is being rotated. When the shaft or work is of a small diameter and of any considerable length it is necessary, in order to take much of a chip therefrom, to place a back rest on the same to prevent it from springing away from the cutting tool, even then in finishing work of this character an extremely fine chip must be taken to prevent the same from springing from the tool, and causing the work to be irregular.

By the use of my device the above difficulties are entirely obviated, the cutter bar in question is of a design particularly adapted to be set into the ordinary tool post of a lathe or the like, and is provided with a pair of adjustable cutters arranged to engage the shaft or work to be turned on opposite sides thereof, thus being enabled to carry two chips at once accomplishing double the work of a single cutter and obviating at the same time the necessity of using a back rest to prevent the springing of the work. The cutters are arranged to be readily adjusted to act upon any diameter of work and are easily removed for sharpening and by the use of my improved device the work of turning down a shaft or the like is greatly facilitated.

The invention is fully set forth in this specification and more particularly pointed out in the appended claim.

In the accompanying drawings: Figure 1— illustrates the cutter bar as held in the tool post of a lathe with the cutters in position therein engaging the work showing a portion of the cutter bar and the adjustable cutter head in section. Fig. 2— is an end view of the adjustable cutter head in position on the cutter bar. Fig. 3— illustrates a perspective view of one of the cutters. Fig. 4— illustrates a modification showing means for holding the second cutter on the opposite side of the work without the employment of an adjustable head.

Referring to the drawings at 1 is represented a portion of the slide rest of a lathe or the like on which is mounted the tool post 2. The cutter bar 3 is preferably constructed of a rectangular bar of steel, one portion 4 of this bar being adapted to enter the said tool post and be held therein by the ordinary binding screw 5. The bar is off-set or carried upward at 6 substantially at right angles to the holding portion 4, to pass over the shaft or body to be operated upon, and then carried forward at 7 substantially parallel with said holding portion 4. A recess or aperture 8 is formed through the said bar at the lower part of the bend thereof, on an angle to the said holding portion for the reception of the cutter 9 which cutter is held in its position in said aperture by the binding screw 10 threaded into the bar.

On the upper forwardly extending portion 7 of this cutter bar is adjustably mounted the cutter head 11 which head is slotted to receive the bar and also to receive in its lower portion the two wedge-shaped plates 12 and 13 which plates are adapted to be moved either in or out to set the cutter 14 which is held between them in the desired position to properly engage the work 15. These wedge-shaped plates and also the knives 14 are held in position in the said head by the thumb screws 16 and 17 and 18, and the whole are securely bound together and held in place by the binding screw 19 which also secures the said head in position on the bar at the same time.

The cutting blades are preferably cut from bars of steel especially prepared as cutters for such work and may be very readily removed, sharpened and replaced.

By the use of my improved device the work of turning down a shaft or the like is reduced more than half, and the result is that the work is of a higher order being much more uniform than could possibly be done by the use of a single tool. Then again the bother of applying and adjusting a back rest is also obviated, the tool is designed to accommodate itself to any ordinary tool holder of a turning lathe or the like and may be quickly applied and readily adjusted to the work.

Having thus described my invention, what I claim as new and desire to secure by Letters Patent, is:

A cutting tool comprising a shank having a comparatively deep offset intermediate its length, said offset being substantially heavier than the ends of said shank, and having a diagonal tool receiving opening traversing its width and projecting into an end of said shank, a cutter head adjustable on the opposite end of said shank, a pair of wedge-blocks carried by said head, said head having an opening therethrough of sufficient depth to receive said shank and said wedge blocks, a set screw entered through said offset to secure a cutter entered in said diagonal opening and a set-screw entered through said head and bearing on said shank to secure a second cutter between said wedges and to suspend said block carrying said second cutter in a position opposing said first mentioned cutter.

In testimony whereof I affix my signature in presence of two witnesses.

ANTHONY E. WALLER.

Witnesses:
Howard E. Barlow,
E. I. Ogden.